Figure 1:
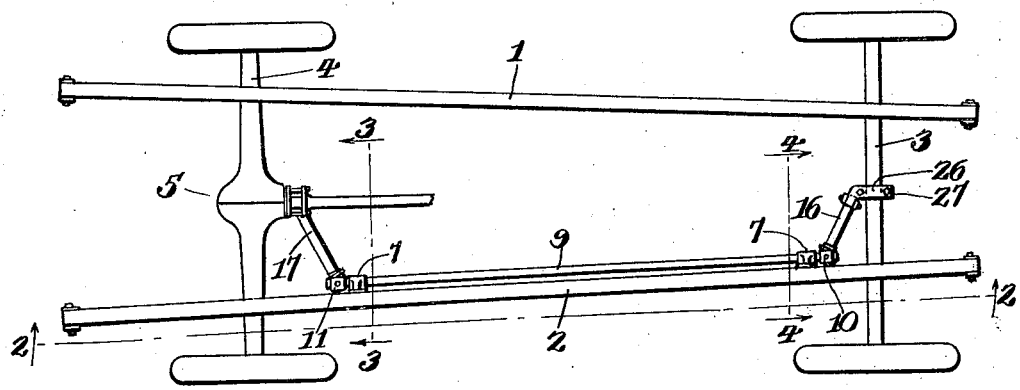

Oct. 1, 1929.  G. H. HAYES  1,730,273
COMBINED SHOCK RESISTOR AND ABSORBER
Filed Nov. 22, 1928

INVENTOR.
George H. Hayes,
BY
Geo. P. Kimmel
ATTORNEY.

Patented Oct. 1, 1929

1,730,273

UNITED STATES PATENT OFFICE

GEORGE H. HAYES, OF ST. PAUL, MINNESOTA

COMBINED SHOCK RESISTOR AND ABSORBER

Application filed November 22, 1928. Serial No. 321,149.

This invention relates to a combined shock resistor and absorber for motor vehicles and has for its object to provide, in a manner as hereinafter set forth, a device of such class for reducing to a minimum the galloping action of a vehicle due to shock, and further whereby shocks to either end of the vehicle are successively resisted and absorbed thereby resulting in comfortable riding to the occupants of the vehicle when the latter travels over an uneven road surface or meets with an obstruction.

A further object of the invention is to provide, in a manner as hereinafter set forth, a device of the class referred to for resisting, distributing and absorbing shock from either end of the vehicle to insure comfortable riding when the vehicle travels over an uneven road surface or meets with an obstruction.

Further objects of the invention are to provide, in a manner as hereinafter set forth, a device of the class referred to which is simple in its construction and arrangement, strong, durable, compact, automatic in its action, thoroughly efficient in its use, readily installed with respect to the chassis and axles of a vehicle and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a top plan view of the chassis and front and rear axles of a motor vehicle and illustrating the adaptation therewith of a shock resistor and absorber in accordance with this invention.

Figure 2:
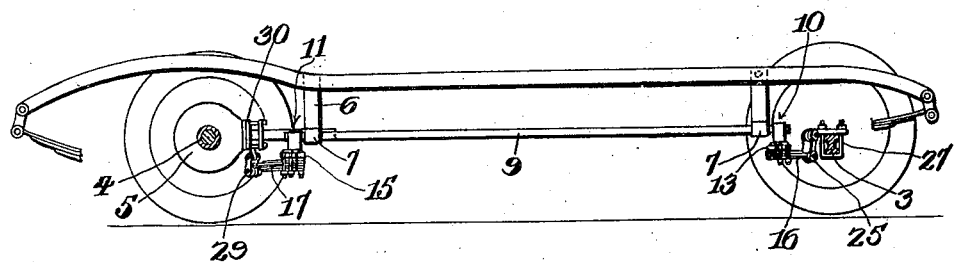
Figure 3:
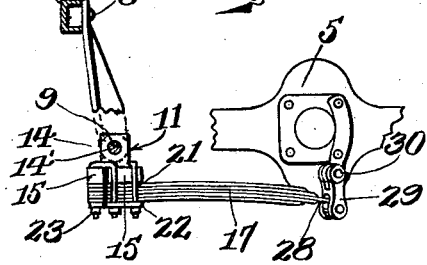
Figure 4:
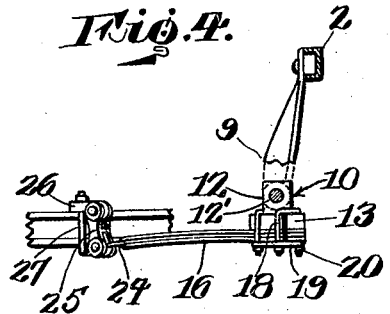

Figure 2 is a section on line 2—2 Figure 1.
Figure 3 is a section on line 3—3 Figure 1.
Figure 4 is a section on line 4—4 of Figure 1.

Referring to the drawings 1 and 2 indicate the side bars of the chassis of a motor vehicle and 3, 4 the front and rear axles respectively of the vehicle. The differential housing is designated 5.

Depending from the inner side of one of the side bars of the chassis, as illustrated the bar 2, is a plurality of spaced shaft hangers 6, as shown two in number, but this number can be increased if desired. Each hanger is formed with a bearing 7 at its lower end. The hangers 6 are secured to the bar 2 by the holdfast vices 8. The hangers 6 are directed inwardly at a slight inclination whereby the lower ends or rather bearings at the lower ends of the hangers will be positioned the desired distance inwardly with respect to a side of the chassis. Rotatably mounted in the bearings 7 as well as projecting forwardly and rearwardly with respect to the hangers 6, is a rotatable shock distributing shaft 9. The length of the hangers 6 is such that the shaft 9 will be suspended above the front axle 3 and substantially in alignment with respect to the rear axle 4. It is to be understood however that the shaft 9 can be suspended at any suitable point with respect to the front and rear axles of the vehicle.

Fixedly secured to the forward and rear ends of the shaft 9 are respectively spring carriers or seat elements 10, 11 of any suitable construction. As illustrated by way of example the carrier 10 is formed of a head 12 and a base 13 and with the former disposed obliquely with respect to the latter. The head 12 is formed with an opening 12′ for one end of shaft 9. The head is vertically disposed and the base horizontally disposed, and with the head merging into the base centrally thereof whereby the base will project laterally in both directions from the lower end of the head 12. As illustrated by way of example the carrier 11 includes a head 14 and a base 15 constructed and arranged in the same manner as the head 12 and base 13 of the carrier 10. The head 14 of carrier 11 is provided with an opening 14′ for the other end of shaft 9. The base 13 of the carrier 10 is disposed at an angle with respect to the front axle 3 and the base 15 of the carrier 11 is disposed at an angle with respect to the rear axle 4. The bases 13 and 15 are disposed at opposite inclinations with respect to each other. The inclination of the base 13 is forwardly and the inclination of the base 15 is rearwardly with respect to the shaft 9.

Associated with the front axle 3 is a combined shock resisting and absorbing element of any suitable construction and which is illustrated by way of example in the form of a laminated, semi-elliptic spring 16 and associated with the rear axle 4 is a combined shock resisting and absorbing element 17 illustrated by way of example in the form of a laminated, semi-elliptic spring. Preferably the laminations of the spring 16 are less in number than the laminations of the spring 17, but it is to be understood that the laminations of the springs 16, 17 can be as desired. The springs 16 and 17 extend inwardly with respect to the shaft 9 and are disposed at an opposite inclination with respect to each other. The spring 16 extends at an inclination towards the axle 3 from the forward end of the shaft 9 and the spring 17 extends at a rearward inclination towards the axle 4 from the rear end of the shaft 9. The outer end of the spring 16 is positioned against the lower face of the base 13 and is fixedly clamped to the latter by the yokes 18, plate 19 and clamping nuts 20.

The outer end of the spring 17 is positioned against the lower face of the base 15 and is fixedly clamped thereto by the yokes 21, plate 22 and clamping nuts 23. The laminations of the springs 16 and 17 at the outer end of each spring are flush with each other. One of the laminations of the spring 16 is of greater length than the other laminations thereof and the lamination of greater length is indicated at 24 and has its inner end connected to a shackle 25 pivotally carried by a coupling member 26 which is fixedly secured as at 27 to the front axle 3 centrally thereof. One of the laminations of the spring 17 is of greater length than the other laminations of such spring and such lamination is indicated at 28 and has its inner end attached to a shackle 29 which is pivotally supported as at 30 from the differential housing 5. The connection between the shackle 29 and differential housing 5 is eccentric with respect to the axis of said housing 5. The springs 16 and 17 can be coupled with the axles of a vehicle by other means than that as shown such as a ball and socket joint or other bearing device for the purpose of taking care of side and end thrusts with respect to the springs.

The rear spring 17 is to be positioned under the housing of the drive shaft and preferably is on a level with the bottom of the differential housing. The bases 13 and 15 preferably are disposed at an angle of 45° with respect to the shaft 9.

With respect to the operation of the device any change with relation to either of the springs of the chassis by either a compression or distention is reflected in a like manner to the spring at the other end of the car, for instance; any obstruction in the path of the front axle that causes a shock and results in compressing the regular car springs raises the carrier, thereby rotating the shaft and compresses the rear spring, and any result of a shock on either forward or rear of the car which tends to throw the car is immediately resisted by causing a like action at the other end of the car.

It is well known that any shock to one end of the vehicle tends to produce the opposite results at the other end of the car, for instance; an obstruction in the rear end of the vehicle that tends to throw the rear end of the vehicle into the air tends to lower the front end of the vehicle and produces what is generally called "galloping". This galloping is reduced to a minimum by the device because the latter will act in a manner whereby any kinds of shock at either end of the vehicle, the first tendency of the device is to resist the shock and immediately normality is approached the resistance returns in an opposite direction, under such conditions absorbing the shock and resulting in more comfortable riding. The action of the device is such that it will resist, distribute and absorb shock and by such action will reduce galloping to a minimum thereby insuring comfortable riding when the vehicle is traveling over an uneven road surface or meets with an obstruction.

It is thought the many advantages of a device, in accordance with this invention can be readily understood and although the preferred embodiment of the invention is as illustrated and described, yet it is to be understood that changes in the details of construction can be had which will fall within the scope of the invention as claimed.

What I claim is:

1. A shock distributing and absorbing device for motor vehicles comprising a rotatably supported shock distributing shaft for positioning longitudinally with respect to the chassis of a vehicle, inwardly disposed, shaft shifting elements, means for fixedly securing the outer ends of said elements to the ends of said shaft, and shackle connection means between the inner ends of said elements to the front and rear axles of the vehicle.

2. A shock distributing and absorbing device for motor vehicles comprising a rotatably supported shock distributing shaft for positioning longitudinally with respect to the chassis of a vehicle, inwardly disposed shaft shifting elements, means for fixedly securing the outer ends of said elements to the ends of said shaft, shackle connection means between the inner ends of said elements and the front and rear axles of the vehicle, and said elements disposed at opposite inclinations.

3. A shock distributing and absorbing device for motor vehicles comprising a rotatably supported shock distributing shaft for positioning longitudinally with respect to the chassis of a vehicle, inwardly disposed shaft shifting elements, means for fixedly securing the outer ends of said elements to the ends of said shaft, and shackle connection means between the inner ends of said elements and the front and rear axles of the vehicle, the pivotal connections between said elements and axles positioned substantially at the transverse centers of the axles of the vehicles.

4. A shock distributing and absorbing device for motor vehicles comprising a rotatably supported shock distributing shaft for positioning longitudinally with respect to the chassis of a vehicle, inwardly disposed shaft shifting elements, means for fixedly securing the outer ends of said elements to the ends of said shaft, shackle connection means between the inner ends of said elements and the front and rear axles of the vehicle, and said elements disposed at an angle with respect to said shaft and extending in opposite directions with respect to each other, the pivotal connections between said elements and axles positioned substantially at the transverse centers of the axles of the vehicles.

5. A shock distributing and absorbing device for motor vehicles, comprising a rotatable shock distributing shaft adapted to be supported from and positioned longitudinally of the chassis of a vehicle, carriers fixedly secured to and depending from the ends of the shaft, inwardly extending shaft shifting elements having their outer ends fixedly secured to said carriers, and shackle connection means between the inner ends of said elements to the front and rear axles of the vehicle.

6. A shock distributing and absorbing device for motor vehicles, comprising a rotatable shock distributing shaft adapted to be supported from and positioned longitudinally of the chassis of a vehicle, carriers fixedly secured to and depending from the ends of the shaft, inwardly extending shaft shifting elements having their outer ends fixedly secured to said carriers, shackle connection means between the inner ends of said elements to the front and rear axles of the vehicle, and said elements disposed at opposite inclinations.

7. A shock distributing and absorbing device for motor vehicles comprising a rotatably supported shock distributing shaft adapted to be suspended from and disposed longitudinally of the chassis of a vehicle, and actuating elements for said shaft, each of said elements being pivotally connected at one end with an axle of the vehicle and fixedly secured at the other end to an end of said shaft.

8. A shock distributing and absorbing device for motor vehicles comprising a rotatably supported shock distributing shaft adapted to be suspended from and disposed longitudinally of the chassis of a vehicle, and actuating elements for said shaft, each of said elements having a shackle connection at one end with an axle of the vehicle and fixedly secured at the other end to an end of said shaft, said shaft being positioned above the axles of the vehicle, said elements arranged below the shaft.

9. A shock distributing and absorbing device for motor vehicles comprising a rotatably supported shock distributing shaft adapted to be suspended from and disposed longitudinally of the chassis of a vehicle, and actuating elements for said shaft, each of said elements having a shackle connection at one end with an axle of the vehicle and fixedly secured at the other end to an end of said shaft, the pivotal connections between said elements and axles being disposed substantially at the transverse center of the axles.

10. A shock distributing and absorbing device for motor vehicles comprising a rotatably supported shock distributing shaft adapted to be suspended from and disposed longitudinally of the chassis of the vehicle, and actuating elements for said shaft, each of said elements having a shackle connection at one end with an axle of the vehicle and fixedly secured at the other end to an end of said shaft, said elements extending inwardly from said shaft, and disposed at opposite inclinations with respect to each other.

11. A shock distributing and absorbing device for motor vehicles comprising a rotatably supported shock distributing shaft adapted to be suspended from and disposed longitudinally of the chassis of a vehicle, actuating elements for said shaft, each of said elements having a shackle connection at one end with an axle of the vehicle and fixedly secured at the other end to an end of said shaft, said shaft being positioned above the axles of the vehicle, said elements arranged below the shaft, said elements extending inwardly from said shaft and disposed at opposite inclinations with respect to each other.

12. A shock distributing and absorbing device for motor vehicles comprising a rotatably supported shock distributing shaft adapted to be suspended from and disposed longitudinally of the chassis of a vehicle, actuating elements for said shaft, said elements each being pivotally connected at one end with an axle of the vehicle and fixedly secured at the other end to an end of said shaft, the pivotal connections between said elements and axles being disposed substantially at the transverse center of the axles, said elements extending inwardly from and at an angle with respect to said shaft, and said elements disposed at opposite inclinations with respect to each other.

In testimony whereof, I affix my signature hereto.

GEORGE H. HAYES.